US010083618B2

(12) United States Patent
Ukelson

(10) Patent No.: US 10,083,618 B2
(45) Date of Patent: Sep. 25, 2018

(54) SYSTEM AND METHOD FOR CROWD SOURCED MULTI-MEDIA LECTURE CAPTURE, SHARING AND PLAYBACK

(71) Applicant: Jacob Ukelson, Lehavim (IL)

(72) Inventor: Jacob Ukelson, Lehavim (IL)

(73) Assignee: Jacob Ukelson, Lehavim (IL)

( * ) Notice: Subject to any disclaimer, the term of this patent is extended or adjusted under 35 U.S.C. 154(b) by 710 days.

(21) Appl. No.: 13/902,880

(22) Filed: May 27, 2013

(65) Prior Publication Data

US 2014/0162234 A1    Jun. 12, 2014

Related U.S. Application Data

(60) Provisional application No. 61/691,281, filed on Aug. 21, 2012.

(51) Int. Cl.
*G09B 5/00*     (2006.01)
*G09B 5/06*     (2006.01)
*G09B 7/02*     (2006.01)

(52) U.S. Cl.
CPC ............. *G09B 5/065* (2013.01); *G09B 7/02* (2013.01)

(58) Field of Classification Search
CPC ....... G06K 9/00261; G06K 2009/3291; G06K 9/00228; G06K 9/00248; G06K 9/00255; G06K 9/00288; G06K 9/0061; G06T 2207/30201; G06T 7/2046; G06T 1/0007; H04N 1/2112; H04N 2101/00; H04N 2201/0084; H04N 5/23219; H04N 21/2387; H04N 21/6131; H04N 21/6377; H04N 21/658; H04N 21/8455; H04N 19/51; H04N 19/61; G06F 17/30017; G06F 17/30038; G09B 5/065
See application file for complete search history.

(56) References Cited

U.S. PATENT DOCUMENTS 5,926,624 A  *  7/1999  Katz et al. .................... 709/217
6,789,228 B1 *  9/2004  Merril et al. ................. 715/243
(Continued)

OTHER PUBLICATIONS

Halawa, Sherif, et al.; ClassX—An Open Source Interactive Lecture Streaming System; Proceeding MM '11 Proceedings of the 19th ACM international conference on Multimedia; pp. 719-722; ACM New York, NY, USA © 2011.*
(Continued)

*Primary Examiner* — Nathan Hillery
(74) *Attorney, Agent, or Firm* — Reches Patents

(57) ABSTRACT

A method, that may include capturing, by a mobile media capture device, audio information related to the lecture during a time period that at least partially overlaps a time period during which the lecture occurs; repeating, during the time period, the stages of: checking, by the mobile media capture device, for an occurrence of an event related to the lecture; selecting, by the mobile media capture device and in response to an occurrence of the event, a selected manner to acquire visual information related to the lecture out of (a) an acquisition, at a first rate, of multiple still images of at least a first resolution and (b) an acquisition of a video stream of up to a second resolution that is lower of the first resolution; wherein the first rate is lower than a rate of acquisition of images of the video stream; and acquiring the visual information according to the selected manner.

23 Claims, 17 Drawing Sheets

(56) References Cited

U.S. PATENT DOCUMENTS

| | | | |
|---|---|---|---|
| 8,831,505 B1* | 9/2014 | Seshadri | 434/351 |
| 2002/0036694 A1* | 3/2002 | Merril | 348/220 |
| 2002/0196327 A1* | 12/2002 | Rui et al. | 348/14.11 |
| 2005/0262543 A1* | 11/2005 | Wu | 725/109 |
| 2008/0317357 A1* | 12/2008 | Steinberg et al. | 382/209 |
| 2009/0003652 A1* | 1/2009 | Steinberg et al. | 382/103 |
| 2009/0208056 A1* | 8/2009 | Corcoran et al. | 382/103 |
| 2009/0263022 A1* | 10/2009 | Petrescu et al. | 382/195 |
| 2009/0303342 A1* | 12/2009 | Corcoran et al. | 348/222.1 |
| 2010/0161580 A1* | 6/2010 | Chipman et al. | 707/706 |
| 2010/0328465 A1* | 12/2010 | Merril et al. | 348/159 |
| 2011/0014929 A1* | 1/2011 | Moshfeghi et al. | 455/456.3 |
| 2011/0033168 A1* | 2/2011 | Iyer | 386/241 |
| 2011/0123972 A1* | 5/2011 | Friedman | 434/308 |

OTHER PUBLICATIONS

Bianchi, Michael; Automatic Video Production of Lectures Using an Intelligent and Aware Environment; MUM2004 Oct. 27-29, 2004 College Park, Maryland, USA Copyright 2004 ACM.*

Chandra, Surendar; Experiences in Personal Lecture Video Capture; IEEE Transactions on Learning Technologies, vol. 4, No. 3, Jul.-Sep. 2011, pp. 261-274.*

Pang et al., ClassX Mobile: Region-of-InterestVideo Streaming to Mobile Devices with Multi-Touch Interaction, MM'11, Nov. 28-Dec. 1, 2011, ACM, pp. 787-788.*

* cited by examiner

Once files have been offloaded from the device to a PC or the cloud, the user will use a website that creates an interactive linked slide show with the captured media. The slide show is created using the captured data and meta data, linking audio to the images and video, providing a slide show of that represents the lecture. The slide show is built to allow the user to have control over the speed of the show — enabling the show to speed up or slow down without affecting the audio. The context may be local or in the cloud. There may be post processing done on the audio and images to create subtitles, close captions, indexing using the information contained in the media.
210

Facilitate an addition of advertisements to be displayed to the user as part of the slide show, or in a separate location on the screen. These may be personalized based on location, or keywords obtained from the audio (through speech to text analysis) or other cues (e.g. analysis of the board or presentation) 220

Generating a media stream by merging the audio information and the visual information. 652

Replacing visual information about content that was displayed during the lecture with content information that represents the content and is provided by a third party. 654

Sending the audio information and the visual information and metadata indicative of at least timing of the acquisition of the audio information and the visual information over a network to a media editing entity. 656

Generating a media stream from audio information and/or visual information acquired by multiple mobile media capture devices 658

650

FIG. 8

SYSTEM AND METHOD FOR CROWD SOURCED MULTI-MEDIA LECTURE CAPTURE, SHARING AND PLAYBACK

RELATED APPLICATIONS

This application claims the priority of U.S. provisional patent Ser. No. 61/691,281 filing date Aug. 21, 2012 which is incorporated herein in its entirety.

BACKGROUND OF THE INVENTION

University lectures captured on video are very popular with students, especially in engineering and science. Studies have shown that students see great value in being able to access lecture videos in order to make up missed classes and review material prior to exams. This value is causing many western universities to adopt some version of lecture capture, even though traditional lecture capture and digital delivery is a hassle for the lecturer and expensive for the university.

Traditional video capture requires specially equipped lecture rooms (cameras, microphones, presentation capture) and sometimes a trained video photographer or editor. The resulting videos are edited and uploaded to the web (entailing hosting, access and management costs). This of course severely limits the number of lectures that are captured in any semester. So even universities that have adopted lecture capture can provide students with access to only a very limited set of lectures.

SUMMARY

Lectures provide a limited, well defined recording context. The first component needed for automated lecture capture is a mobile application with a template tailored to the capture requirements of a university lecture, providing capture guidance and direction just like a cameraman but with minimal setup by the user. Using the smartphone's UI capability combined with its real-time analysis of audio, and image\video streams (along with other available sensor data like location), users tailor the template to their specific lecture by initializing the app with context, e.g. point out certain areas of interest in the scene like the whiteboards and presentation area, setup the audio—and let the smartphone do the rest automatically by manipulating its cameras, microphones and sensors using audio, image and video processing capabilities to ensure proper capture for the context.

The smartphone can shoot completely unattended using a script and self-monitor to ensure high quality capture of all the elements of the lecture. It can also be used in semi-automated fashion; letting the user control various capture aspects themselves, like when to capture an image or video. The resulting media segments can be viewed locally on the smartphone, or can be automatically uploaded to a cloud server along with the meta-data needed to enable automatic or manual post-processing. The back-end server uses more robust audio\image\video analysis along with a lecture presentation template, metadata, other versions of the same lecture (if available) and other content (e.g. PowerPoint) to create a context appropriate, multi-media version of the lecture, all with no manual effort. This makes lecture capture simple enough so that students can do it themselves with no training, creating crowd sourced versions of a lecture and making it feasible for students to capture every class of every course for later review.

There is provided an application that once used all a user needs to do is set the smartphone down on a table, point it at the front of the room and use the simple "augmented reality" lecture configuration interface. The user points out the whiteboard, where the presentation is to be screened and ensures audio capture is working. This application does the rest automatically—monitoring and directing the capture process while providing the metadata needed for automatic post processing of the media streams.

Once recorded, students can share lectures through a portal. Students have the choice of keeping lectures private, sharing with their classmate, sharing with their department or with anyone in the university. Advertisements will be shown during playback, generating revenue. Other revenue options can be achieved through add-ons and premium features.

The suggested application is just an example of using an automated media capture platform leveraging media capabilities of modern smart smartphones to capture the media streams of "structured" events (SmartCapture). SmartCapture uses scripts (or templates) to guide the specific media capture context (e.g. a university lecture), providing guidance and direction for capture just like a cameraman and director. Using the smartphone's UI capability combined with its real-time analysis of audio and image\video streams (along with other available sensor data like location), users tailor the template to their specific needs.

To use SmartCapture, users initialize the app with context, e.g. point out certain areas of interest in the scene, setup the audio—and let the smartphone do the rest. The SmartCapture application uses the selected script to manipulate the smartphone's cameras, microsmartphones and sensors using audio, image and video processing capabilities to ensure proper capture for the context.

The smartphone can shoot completely unattended and self-monitor, or provide the operator with context relevant creative direction for either automated or semi-automated capture of high quality media. The resulting media segments can be uploaded to a cloud server along with the meta-data needed to enable a post-processing phase. The back-end server can use more robust audio\image\video analysis along with the template and metadata to create a context appropriate multi-media presentation with no manual effort.

SmartCapture is applicable to any number of domains; university lecture capture is a good first example. The components of a university lecture are well defined and can be predefined as a set of templates. The audience and their needs are also well defined. By using lecture capture as the first application of SmartCapture platform, we can create a platform whose capabilities grow along with the computational and capture capabilities of smartphones.

According to an embodiment of the invention there may be provided a method for capturing visual information and audio related to a lecture, the method comprises: capturing, by a mobile media capture device, audio information related to the lecture during a time period that at least partially overlaps a time period during which the lecture occurs; repeating, during the time period, the stages of: checking, by the mobile media capture device, for an occurrence of an event related to the lecture; selecting, by the mobile media capture device and in response to an occurrence of the event, a selected manner to acquire visual information related to the lecture out of (a) an acquisition, at a first rate, of multiple still images of at least a first resolution and (b) an acquisition of a video stream of up to a second resolution that is lower of the first resolution; wherein the first rate is lower than a rate of acquisition of images of the video stream; and acquiring the visual information according to the selected manner.

The selecting is indifferent to imaging conditions.

The event is an appearance of a face of a lecturer, within a region of interest, for a continuous period that exceeds a threshold.

The event related to the lecture is a detection of human movement, within a region of interest, for a continuous period that exceeds a threshold.

The method may include, defining, by the mobile media capture device, as a default image acquisition manner the acquisition, at the first rate, of multiple still images of at least the first resolution.

The method may include: receiving, by the mobile media capture device and from a user, a definition of a region of interest that comprises an object that is expected to convey information related to the lecture; and selecting, by the mobile media capture device, image acquisition characteristics to be applied during the acquisition of the visual information in response to image acquisition conditions that exists within the region of interest and regardless of image acquisition conditions that exist outside the region of interest.

The method may include inducing, by the mobile media capture device, a user to place an mobile media capture device in front of a face of the user and direct the module media capture device towards an object that is expected to bear information related to the lecture; inducing, by the mobile media capture device, the user to define a region of interest that comprises the object that is expected to bear information related to the lecture; acquiring, by the mobile media capture device, image of an area that comprises the object; inducing, by the mobile media capture device, the user to lower the mobile media capture device and place the mobile media capture device on a supporting element while displaying, by the mobile media capture device, to the user a field of view of a camera of the mobile media capture device and a representation of the image of the area.

The method may include generating a media stream related to the lecture by merging the audio information and the visual information.

The method may include replacing or enhancing visual information about content that was displayed during the lecture with content information that represents the content and is provided by a third party.

The method may include sending the audio information and the visual information and metadata indicative of at least timing of the acquisition of the audio information and the visual information over a network to a media editing entity.

The method may include replacing a consecutive still images of the multiple still images that are equal to each other by only a single still image and deleting other still images of the consecutive still images.

The method may include inter image compression to be applied on the still images.

According to an embodiment of the invention there may be provided a non-transitory computer readable medium that includes instructions to be executed by a computerized system and include instructions for: capturing, by a mobile media capture device, audio information related to the lecture during a time period that at least partially overlaps a time period during which the lecture occurs; repeating, during the time period, the stages of: checking, by the mobile media capture device, for an occurrence of an event related to the lecture; selecting, by the mobile media capture device and in response to an occurrence of the event, a selected manner to acquire visual information related to the lecture out of (a) an acquisition, at a first rate, of multiple still images of at least a first resolution and (b) an acquisition of a video stream of up to a second resolution that is lower of the first resolution; wherein the first rate is lower than a rate of acquisition of images of the video stream; and acquiring the visual information according to the selected manner.

The selecting is indifferent to imaging conditions.

The event is an appearance of a face of a lecturer, within a region of interest, for a continuous period that exceeds a threshold.

The event related to the lecture is a detection of human movement, within a region of interest, for a continuous period that exceeds a threshold.

The non-transitory readable medium may store instructions for defining, by the mobile media capture device, as a default image acquisition manner the acquisition, at the first rate, of multiple still images of at least the first resolution.

The non-transitory readable medium may store instructions for: receiving, by the mobile media capture device and from a user, a definition of a region of interest that comprises an object that is expected to convey information related to the lecture; and selecting, by the mobile media capture device, image acquisition characteristics to be applied during the acquisition of the visual information in response to image acquisition conditions that exists within the region of interest and regardless of image acquisition conditions that exist outside the region of interest.

The non-transitory readable medium may store instructions for: inducing, by the mobile media capture device, a user to place an mobile media capture device in front of a face of the user and direct the module media capture device towards an object that is expected to bear information related to the lecture; inducing, by the mobile media capture device, the user to define a region of interest that comprises the object that is expected to bear information related to the lecture; acquiring, by the mobile media capture device, image of an area that comprises the object; inducing, by the mobile media capture device, the user to lower the mobile media capture device and place the mobile media capture device on a supporting element while displaying, by the mobile media capture device, to the user a field of view of a camera of the mobile media capture device and a representation of the image of the area.

The non-transitory readable medium may store instructions for generating a media stream related to the lecture by merging the audio information and the visual information.

The non-transitory readable medium may store instructions for replacing visual information about content that was displayed during the lecture with content information that represents the content and is provided by a third party.

The non-transitory readable medium may store instructions for sending the audio information and the visual information and metadata indicative of at least timing of the acquisition of the audio information and the visual information over a network to a media editing entity.

The non-transitory readable medium may store instructions for replacing consecutive still images of the multiple still images that are equal to each other only a single still image and deleting other still images of the consecutive still images.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 illustrates a method according to an embodiment of the invention;

FIG. 8 illustrates a stage of the method of FIG. 6 according to an embodiment of the invention;

Figure 1:
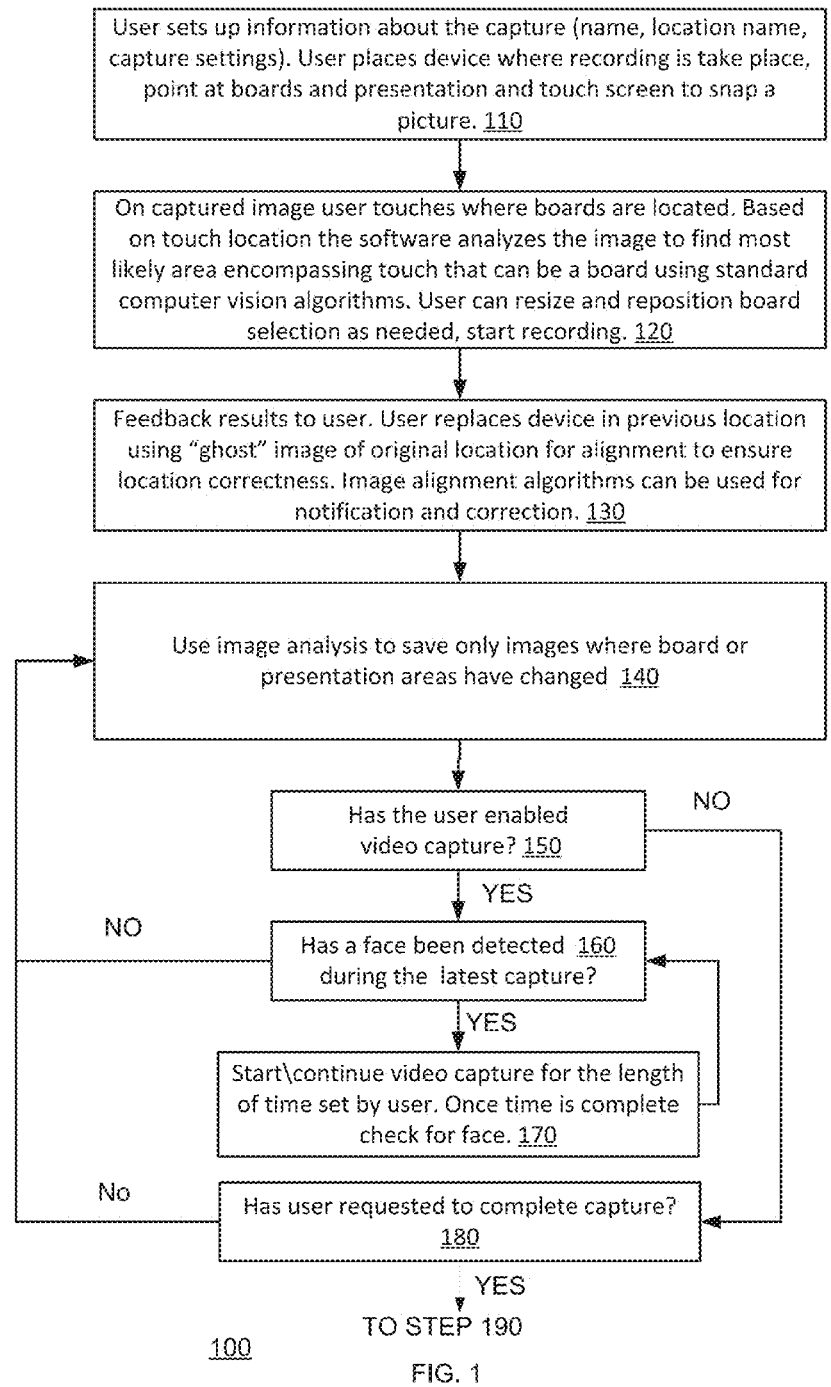
FIGS. 1-2 illustrate a method according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may, for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium. A lecture or presentation given in a room to a number of attendees consists of a single scene (the lecture), and a very limited set of actors (e.g. lecturer, whiteboard, presentation, audience) in a confined space. This simplicity means that a capture script can be created which provides capture guidance and direction for the cameraperson with minimal setup which will allow fully automated or mostly automated capture.

Mobile media capture devices are mobile devices that are capable of capturing media. Non-limiting example of such devices include smartphones (sophisticated mobile phones) and may have equivalent computational power to a desktop PC of only a few years back, and their computational capabilities are continuing to grow. Smart phones also have unique sensor and audio\imaging\video capabilities not usually available on PCs. The multi-media capabilities, network capabilities, compute power and availability pave the way for smart phones to be a platform for automated video capture (and/or multi-media capture), where the smart phone analyzes the scene to be captured in real-time in order to provide creative direction for the capture. The processing capabilities of a smart phone aren't yet powerful enough to provide analysis of complex scenes in real time, but they are enough if the scene to be captured has a limited set of well-defined components and the context is well understood.

There may be provided a mobile application with a template tailored to the capture requirements of a university lecture, providing capture guidance and direction just like a cameraman but with minimal setup.

Using the smart phone's user interface (UI) capability combined with its real-time analysis of audio, images and video streams (along with other available meta data like location), users tailor the template in a few moments to their specific needs e.g. point out certain areas of interest in the scene like the whiteboards and presentation area, setup the audio—and let the smart phone do the rest automatically by manipulating its cameras, microphones and sensors using audio, image and video processing capabilities to ensure proper capture for the context.

The smart phone can shoot completely unattended using a script and self-monitor to ensure high quality multi-media capture of all the elements of the lecture. The resulting media segments are automatically (or on-demand) uploaded to a cloud server along with the metadata needed to enable an automatic post-processing phase. The back-end server uses more robust audio\image\video analysis along with a lecture presentation template, metadata and other content (that may be provided by the lecturer or another third party) to create a context appropriate, professional looking edited multi-media capture of the lecture, all with no manual effort.

Automated multi-media capture can make lecture capture simple enough so that untrained users can do it themselves with minimal effort and no training. That would make lecture capture the equivalent of video note taking, making those notes available to every student, for every class of every course. Captured lectures can be distributed by using various methods and means of communication. For example—shared lectures can be downloaded from a website, via email or via shared storage. The website can be enhanced so that users can share and augment the content of the lectures they record.

Using such an application, all that is needed to record a lecture is to set a smart phone down on a table, point it at the front of the room and use the simple "augmented reality" lecture configuration interface—pointing out the whiteboard, where the presentation is to be screened and ensure audio capture is working. The application does the rest automatically—monitoring and directing the capture process while providing the metadata needed for automatic post processing of the media streams.

The captured media and metadata can be viewed on the device or can be (automatically or on-demand) up loaded to cloud based back end servers, which do the post-processing and editing needed to transform the captured data to a quality multi-media presentation appropriate for a university lecture. The backend automatically creates a multi-media presentation that both looks professional and delivers the greatest value for students (e.g. high resolution board capture). Depending on the audience (e.g. students reviewing a lecture they attended, remote attendance of a course) a different template may be applied to create a slightly different "cut" of the lecture, using the same captured media. The backend server can also augment the audio\images\video with extra streams of data, e.g. PowerPoint™ slides used in the lecture and tailor it to viewing on different devices or merging multiple captures of a single lecture into one (by choosing the taking the best media snippets from each capture)

By enabling high quality multi-media capture of every class for every course during each semester the application changes the economics of traditional video capture.

Those captured lectures can serve as the centerpiece of course specific portals for students, creating a place for students to review, better understand and assimilate the lectures' content. By adding social media for interaction between students in a course, adding student\teacher generated content such as lecture notes and content analysis to enable links to related material on the web, we can create a platform to enhance a students learning experience.

Using an augmented reality user interface (UI) capability combined with its real-time analysis of audio and image\video streams (along with other available meta data like location), the cameraperson configures the script to their specific lecture.

For example the cameraperson initializes the app with areas of interest in the scene like the whiteboards, presentation area and sets up the audio. The smart phone then captures the scene automatically by manipulating its cameras, microphones and sensors using audio, image and video processing capabilities to ensure proper media capture and uploading.

The user can also decide to use a stand to hold the camera steady so it is facing the lecture artifacts. The user may also use external devices such as microphones and lenses to achieve better quality capture.

Microphones are of special interest since audio quality is an important factor in lecture capture. On a smart phone the voice capture microphone is positioned and focused in order to optimize capture of a user's voice when making a phone call. For lecture capture the audio is coming from the direction the camera is pointed, and sometimes from quite a distance.

According to an embodiment of the invention the audio recording capabilities can be improved by using an external microphone or a directional sound enhancing horn (also known as Ear-Trumpet—(http://en.wikipedia.org/wiki/Ear_trumpet). Alternatively—a user can use a stand, the large end pointed in the direction of the sound to be captured, the small end fed directly into the smart phone's microphone feed—audio can be directionally captured and concentrated into the existing microphone, focusing the audio captured with the video\images.

Other solutions may involve audio processing during capture that tailored by the script as needed so the smartphone can decide to do audio enhancement for remote sources during a lecture as opposed to a conversation. Assuming there are multiple microphones (per smartphone) the smartphone can decide to use the appropriate microphone that is the best match for a given script.

For a simple, single scene context like a lecture, after setup the smart phone can shoot completely unattended using self-monitoring to ensure high quality capture of the important elements of the lecture.

According to an embodiment of the invention the flow for the capture of a lecture\presentation lecture is:

a. General Set Up—the user is allowed to choose whether the lecture will include both presentations and whiteboards, and/or choose whether the lecture will include demonstrations b. Room specific setup—the user can be requested to provide the locations of the presentations and boards that will be used during the lecture. Using computer vision and direct manipulation—the user instructs the smart phone on the locations of the different artifacts. The user may use a touch screen that displays the image to indicate the locations of the artifacts. The system automatically computes the likely size of a presentation of board area for those locations which the user can resize using direct manipulation. The user has complete control over the number and size of the areas as needed.

After the set up the smart phone can perform an automated capture of the lecture artifacts.

The automated capture of the lecture artifacts may include:

a. Capture each of the boards and presentations used. The system knows the location and size of the different artifacts and can set zoom, white balance, focus or any other camera parameters to ensure proper capture of any specific artifact. For example, a presentation is brightly lit while a board may be quite dark. The system manipulate the camera so that it will be correct based on the artifact being captured. The microphone parameters may be manipulated so that they will be optimal for audio being captured.

b. If an artifact requires high-resolution, the systems will capture the artifact as an image, rather than video (since images enable a much higher resolution then video).

c. The smart phone can perform an automatic switching between artifacts—this can be done based on a script (e.g. a capture of an artifact every 15 seconds) or on events (if the speaker is facing the audience for some defined period of time, then capture the speaker. Since the speaker is a dynamic target and high resolution is not needed—the capture of the speaker can be done as video).

d. The Continuous capture of the audio of the lecture\presentation either directly or using various enhancement techniques based on the fact that this is a lecture (e.g. noise reduction, focus on the spectrum of human speech).

Generation of a multimedia presentation—these multimedia captures can then be combined and linked (e.g. create a slideshow that combines the images, audio and video into a multimedia presentation to recreate the experience of the lecture.

The resulting multimedia presentation can be viewed directly on the smart phone, or can be exported to a PC or the web.

Figure 2:
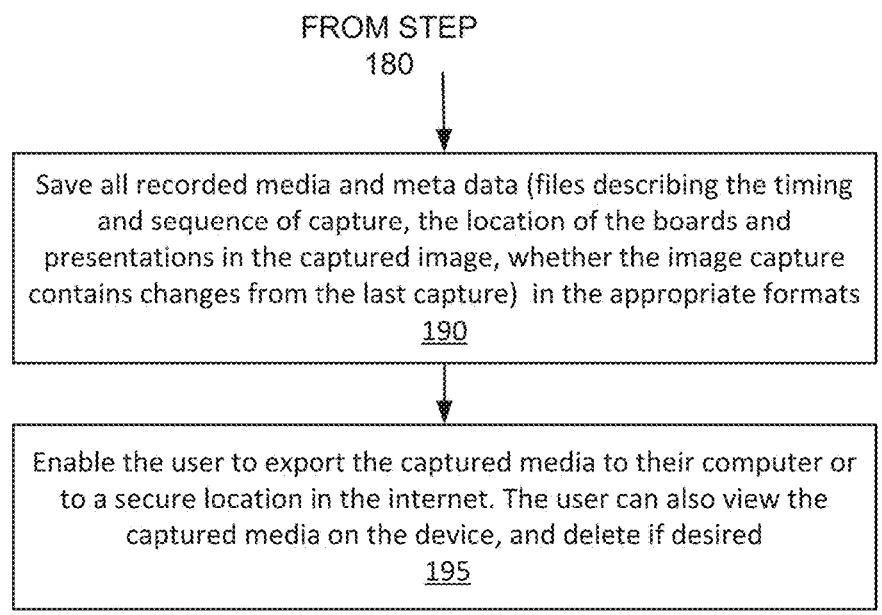

The multimedia presentation can be enhanced in various ways:

a. speed up the presentation and audio,
b. slow down the presentation and audio,
c. go to the audio linked to a specific board image or presentation slide,
d. skip to the audio associated with a specific captured image or video,
e. automated closed captioning or translation
f. automated indexing based on audio
g. handwriting to text for captioning and indexing
h. powerpoint to text for captioning and indexing FIGS. 1 and 2 illustrate method 100 according to an embodiment of the invention. Method 100 includes a sequence of stages 110, 120, 130 and 140. Stage 140 is followed by query stages 150, 160. Method 100 further includes stage 170, query stage 180 and stages 190 and 195.

User (110) sets up information about the capture (name, location name, capture settings). User places device where recording is take place, point at boards and presentation and touch screen to snap a picture.

On captured image user touches the screen at a location (120) where boards are located. Based on touch location the software analyzes the image to find most likely area encompassing touch that can be a board using standard computer vision algorithms. User can resize and reposition board selection as needed, start recording.

Feedback results are provided (130) to the user. User replaces device in previous location using "ghost" image of original location for alignment to ensure location correctness. Image alignment algorithms can be used for notification and correction, or also for automated start\stop of the capture (See FIG. 14—image 1430, alignment image 1410 that includes the outlines of a board 1420). If the user puts the smartphone back in the right position and stops moving, capture can start. If the user picks the smartphone up and it is no longer aligned and focused—the smartphone can stop capture. The capture or at least the stop and start points the capture can be defined by using other smartphone sensors (e.g. the accelerometer to enhance the capture).

Recording (140)—Capture audio continuously and take still images of all marked board and presentation areas—set camera parameters (e.g. focus, white balance) on the user selected locations. Cycle between the different boards as need using the time interval set by the user.

The difference between the acquisitions of the different image may be few seconds.

Stage 140 is followed by query stage 150 of checking has the user enabled video capture? If yes—query stage 150 is followed by query stage 160—else it is followed by stage 180.

Query stage 160 includes checking if a face been detected during the latest capture in a designated area—the designated area may be selected by the user—so that an appearance of a face of the lecturer within the area will indicate that the lecturer gives a speech and should be recorded. Alternatively the designated area may be calculated in response to the location of the board. It may be assumed that a face of a lecturer may be detected near the board and this may imply that the lecturer is talking to the students. (See FIG. 13—designated area 1310 marked by user) If the answer is positive stage 160 is followed by stage 170, else it is followed by stage 140.

Start\continue (170) video capture for the length of time set by user. Once time is complete check for face.

Stage 180 checks if the user requested to complete capture. If yes—stage 180 is followed by stages 190 and 195. Else—stage 180 is followed by stage 140.

Save (190) all recorded media and meta data (files describing the timing and sequence of capture, the location of the boards and presentations in the captured image, whether the image contain changes from the last capture) in the appropriate formats—formats that will allow a computerized entity (smart phone or another computer) to generate a presentation while synchronizing the audio and visual information.

This may include comparing a board\presentation capture to a previous capture of the same board\presentation. An algorithm is used to analyze the images and decide whether they are the same. If the images are same (as defined by the algorithm) the image is discarded since no change was detected, other wise the image is saved. This saves space, network transmission and helps with appropriate indexing. It also enables the system to more frequently capture artifacts without increasing the size of the captured lecture with no loss of quality. Inter-image compression can also be used to reduce the size of the captured lecture with minimal reduction of quality.

Enable (195) the user to export the captured media to their computer or to a secure location in the internet. The user can also view the captured media on the device, and delete if desired.

FIG. 3 illustrates method 200 according to an embodiment of the invention.

Method 200 includes stage 210 and 220.

Stage 210 is executed once files have been offloaded from the device to a PC or the cloud and includes using a website that creates an interactive linked slide show with the captured media. The multi-media presentation is created using the captured data and meta data, linking audio to the images and video, providing a multi-media presentation that represents the lecture. The multi-media presentation is built to allow the user to have control over the speed of the presentation—enabling the show to speed up or slow down without affecting the audio. The context may be local or in the cloud.

There may be post processing done on the audio and images to enhances the visuals, enhance the audio, create subtitles, close captions, indexing using the information contained in the images\video.

Stage 220 may be included in stage 210 or may follow stage 210 and may include facilitating an addition of advertisements (text, images, video and/or audio) to be displayed to the user as part of the slide show, or in a separate location on the screen. These may be personalized based on location, or keywords obtained from the audio (through speech to text analysis) or other cues (e.g. analysis of the board or presentation).

Method 200 may include merging different multi-media captures taken of the same lecture. The method may include combining lectures captured by multiple sources. If more than one student captures a lectures—the method can combine the captured lecture taking the best parts from each capture a combining it into a single coherent lecture.

Figure 4:
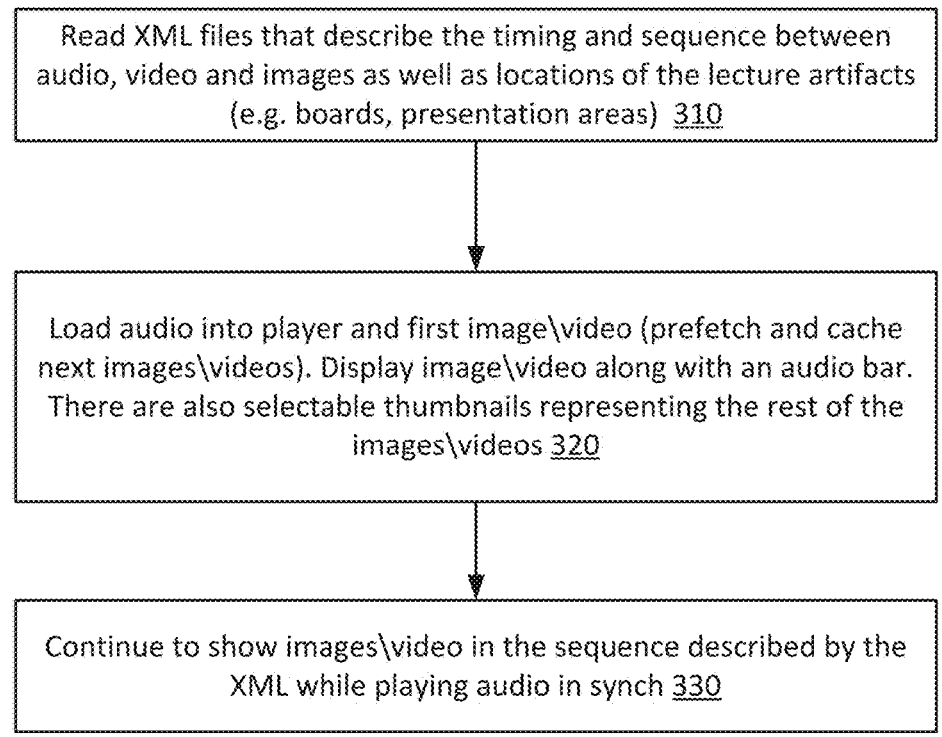
FIG. 4 illustrates a method according to an embodiment of the invention.

FIG. 4 illustrates method 300 according to an embodiment of the invention. It is assumed that the metadata such as timing information, location of the lecture artifacts (e.g. boards) are embedded in XML files or another structured data format. Method 300 includes a sequence of stage 310, 320 and 330.

Read (310) XML files that describe the timing and sequence between audio, video and images.

Load (320) audio into player and first image\video (prefetch and cache next images\videos). Display image\video along with an audio bar. There are also selectable thumbnails representing the rest of the images\videos.

Continue (330) to show images\video in the sequence described by the XML while playing audio in synch.

Figure 5:
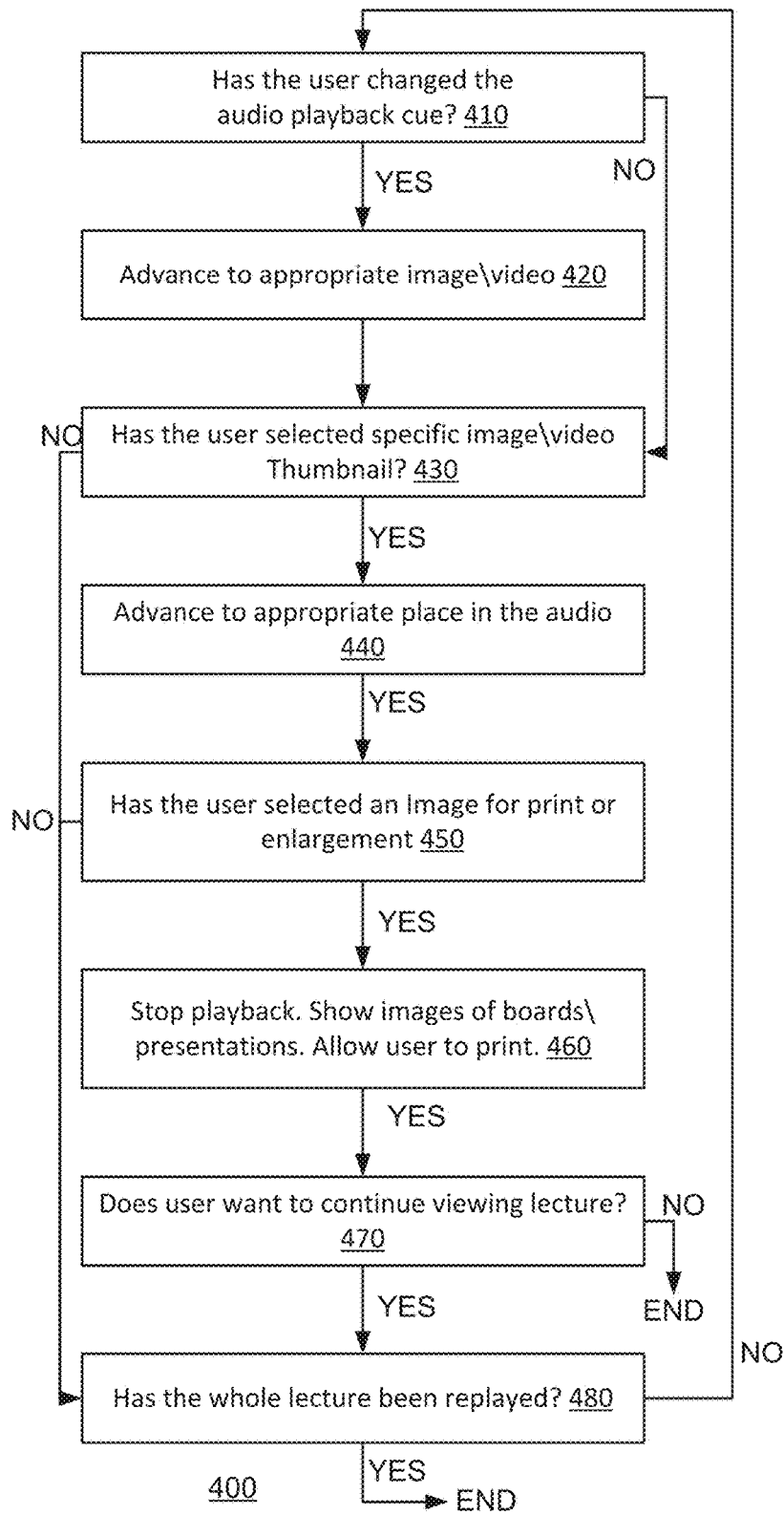
FIG. 5 illustrates a method according to an embodiment of the invention.

FIG. 5 illustrates method 400 according to an embodiment of the invention. Method 400 illustrates how a user views the captured lecture. Method 400 includes stages 410-480.

Method 400 starts by checking (410) has the user changed the audio playback cue? If yes—jump to stage 420 of advancing to appropriate image\video else—jump to stage 430.

Stage 430 includes checking if the user selected specific image\video Thumbnail? (or if receiving a request to skip forward or back to next image\video capture). If yes—jump to stage 440 of advancing to the appropriate place in the audio else—jump to stage 480.

Stage 440 may be followed by stage 450 of checking if the user selected an Image for print or enlargement.

If yes—jump to stage 460 stop playback, show images of boards\presentations and/or allow a user to print. Else—jump to stage 480.

Stage 460 may be followed by stage 470 of checking does the user want to continue viewing lecture? If no—END, else—jump to stage 480 of checking if the whole lecture been replayed? If yes—END—else—jump to stage 410.

Figure 6:
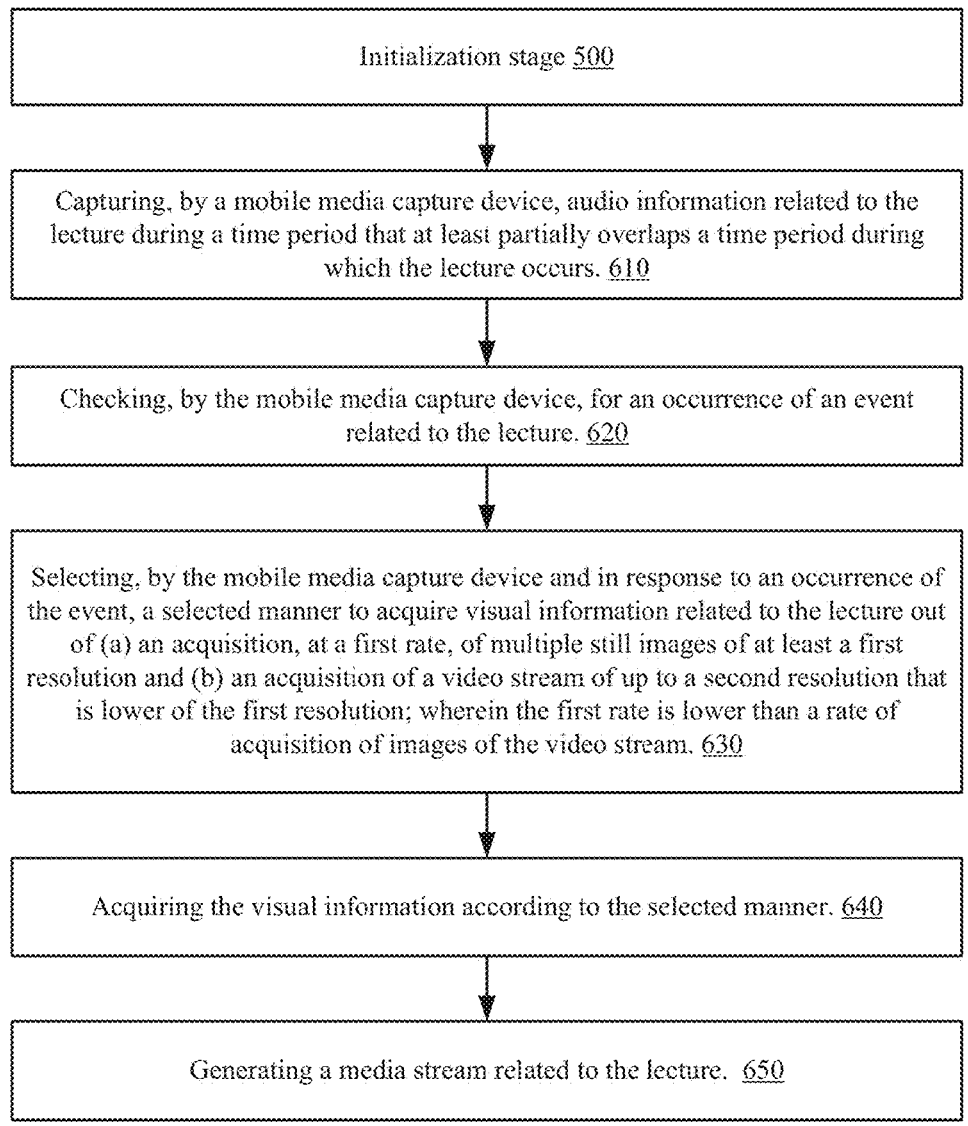
FIG. 6 illustrates a method according to an embodiment of the invention.

FIG. 6 illustrates method 555 according to an embodiment of the invention.

Method 555 includes sequence of stages 500, 610, 620, 630, 640 and 650.

Figure 7:
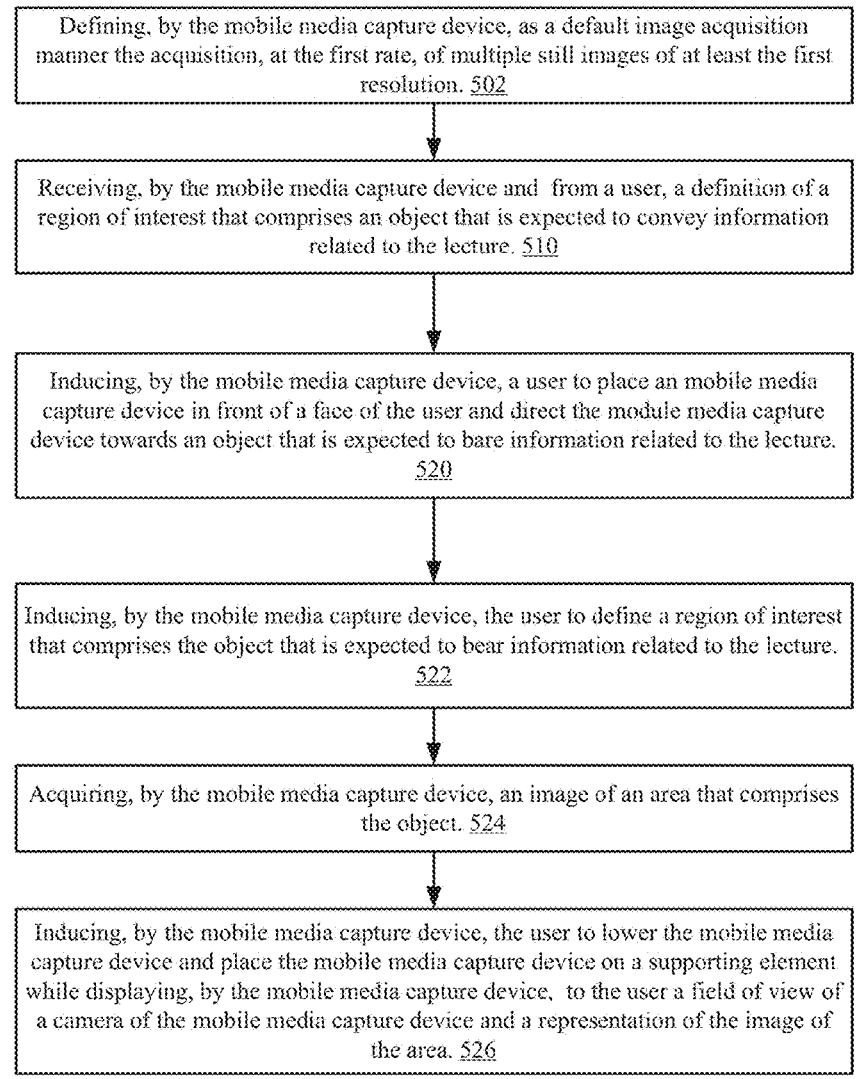
FIG. 7 illustrates a stage of the method of FIG. 6 according to an embodiment of the invention.

Stage 500 is an initialization stage and may include any of the stages illustrated in FIG. 7.

Stage 610 may include capturing, by a mobile media capture device, audio information related to the lecture during a time period that at least partially overlaps a time period during which the lecture occurs.

Stage 620 may include checking, by the mobile media capture device, for an occurrence of an event related to the lecture.

Stage 630 may include selecting, by the mobile media capture device and in response to an occurrence of the event, a selected manner to acquire visual information related to the lecture out of (a) an acquisition, at a first rate, of multiple still images of at least a first resolution and (b) an acquisition of a video stream of up to a second resolution that is lower of the first resolution; wherein the first rate is lower than a rate of acquisition of images of the video stream.

Stage 640 may include acquiring the visual information according to the selected manner.

Stage 650 may include generating a media stream related to the lecture.

FIG. 7 illustrates stage 500 of method 555 according to an embodiment of the invention.

Stage 500 may include a sequence of stages 502, 510, 520, 522, 524 and 526.

Stage 502 may include defining, by the mobile media capture device, as a default image acquisition manner the acquisition, at the first rate, of multiple still images of at least the first resolution.

Stage 510 may include receiving, by the mobile media capture device and from a user, a definition of a region of interest that comprises an object that is expected to convey information related to the lecture.

Stage 520 may include inducing, by the mobile media capture device, a user to place an mobile media capture device in front of a face of the user and direct the module media capture device towards an object that is expected to bear information related to the lecture Stage 522 may include inducing, by the mobile media capture device, the user to define a region of interest that comprises the object that is expected to bear information related to the lecture.

Stage 524 may include acquiring, by the mobile media capture device, an image of an area that comprises the object.

Stage 526 may include inducing, by the mobile media capture device, the user to lower the mobile media capture device and place the mobile media capture device on a supporting element while displaying, by the mobile media capture device, to the user a field of view of a camera of the mobile media capture device and a representation of the image of the area.

FIG. 8 illustrates stage 650 of method 555 according to an embodiment of the invention.

Stage 650 may include any of the following stages 652, 654, 656 and 658.

Stage 652 may include generating a media stream by merging the audio information and the visual information.

Stage 654 may include replacing or enhancing visual information about content that was displayed during the lecture with content information that represents the content and is provided by a third party.

Stage 656 may include sending the audio information and the visual information and metadata indicative of at least timing of the acquisition of the audio information and the visual information over a network to a media editing entity (such as a server).

Stage 658 may include generating a media stream from audio information and/or visual information acquired by multiple mobile media capture devices. The generation may include finding video\image\audio information related to similar points of time and checking that the video\image\audio information relates to the same part of the lecture (by checking timing information and/or similarity between content) and checking the better quality video\image\audio information or content (such as presentations themselves) to be provided from a third party.

Figure 9:
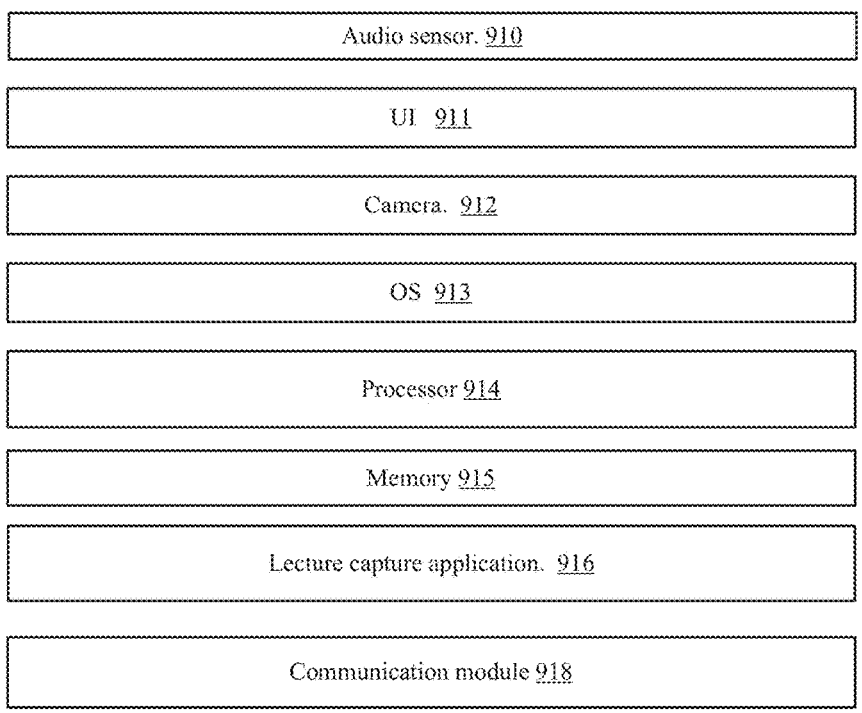
FIG. 9 illustrates a smart phone according to an embodiment of the invention.

FIG. 9 illustrates smart phone 900 according to an embodiment of the invention.

Smart phone 900 includes audio sensor (microphone 910), user interface (UI) 911 that may include a touch screen, camera 912, operating system OS 913, processor 914, memory 915, lecture capture application 916 capable of executing any of the methods mentioned above (or at least part of these methods), and communication module 918 such as radio frequency transmitter and receiver.

Figure 10:
FIG. 10 is a home page of a website according to an embodiment of the invention.
Figure 11:
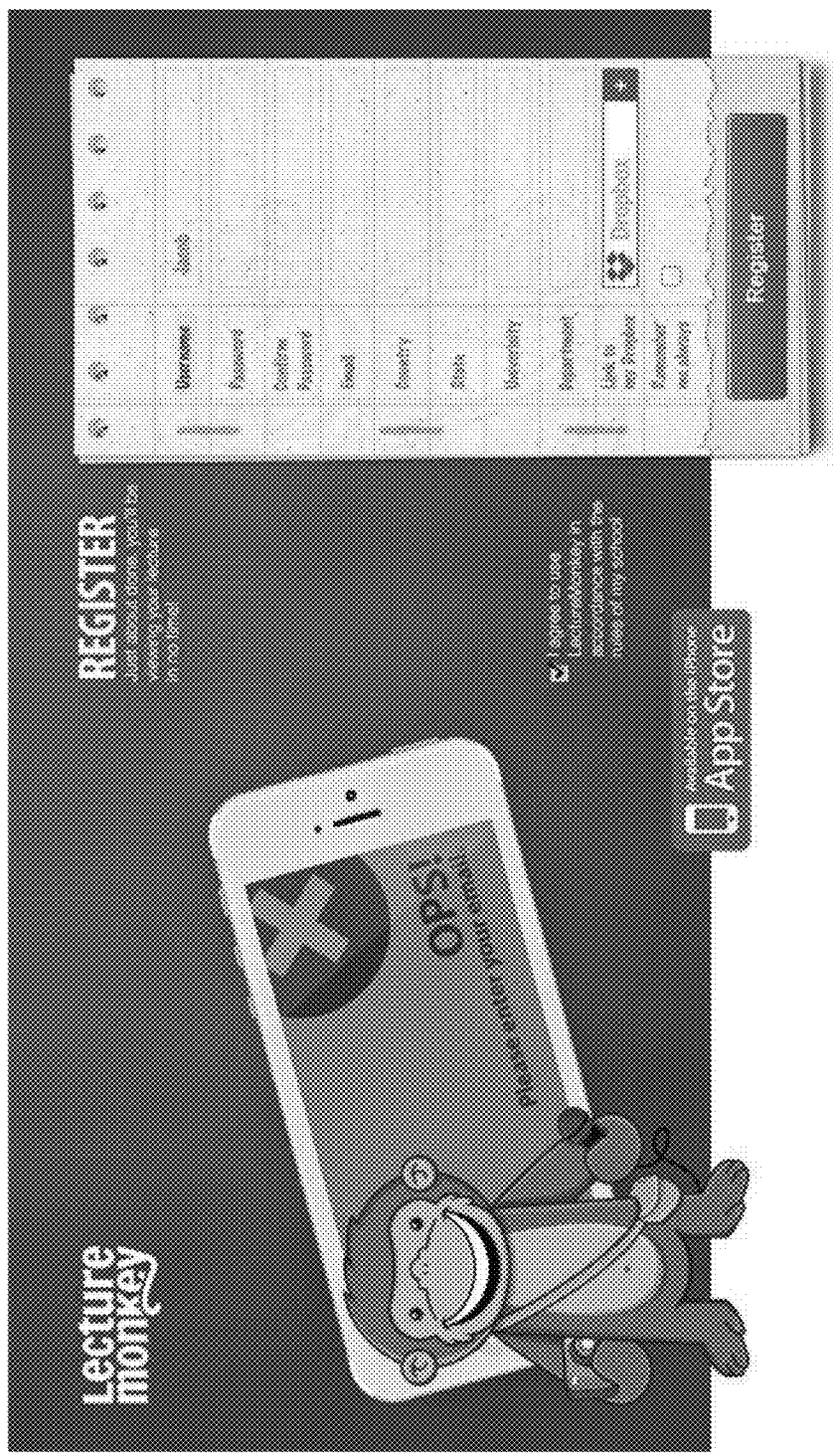
FIG. 11 is a home page of a registration page of the website according to an embodiment of the invention.
Figure 12:
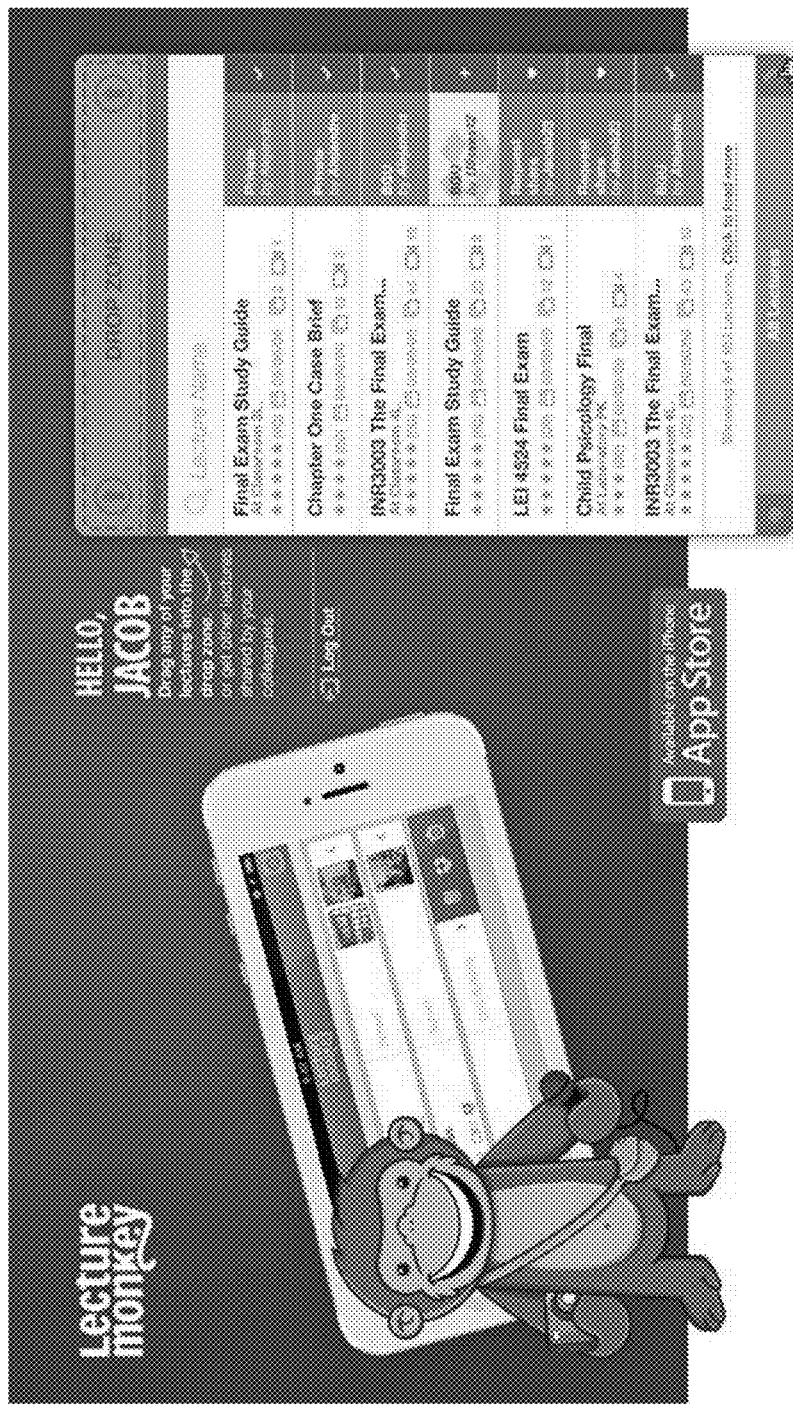
FIG. 12 is a registered user page of a website showing lectures that are relevant to the registered user according to an embodiment of the invention.

FIG. 10 is a home page 1000 of a website according to an embodiment of the invention. FIG. 11 is a registration page 1100 of the website according to an embodiment of the invention. FIG. 12 is a registered user page 1200 of a website showing lectures that are relevant to the registered user according to an embodiment of the invention.

Figure 13:
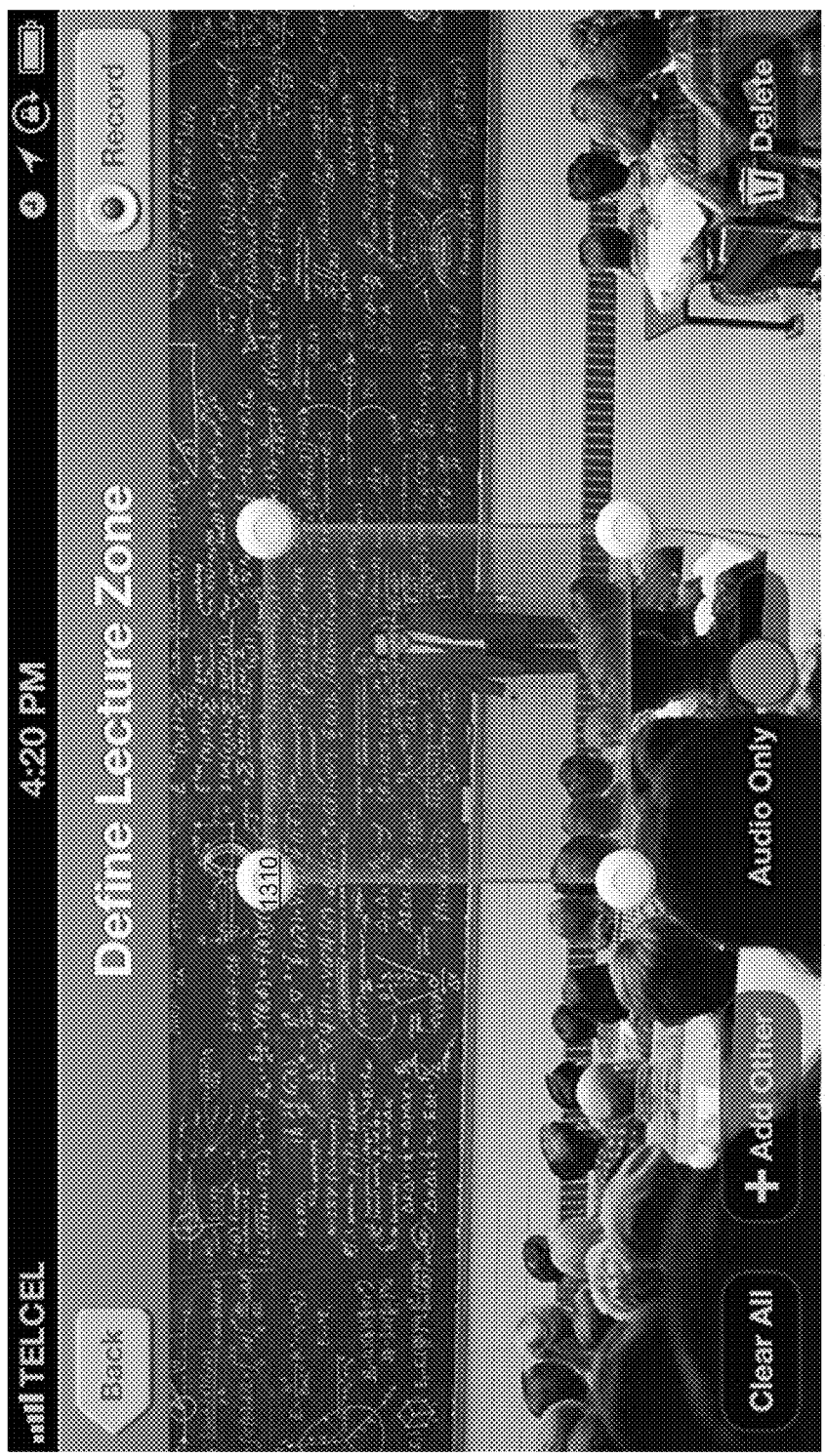
FIG. 13 illustrates an image displayed on a touch screen and a selection by the user of a designated area according to an embodiment of the invention.

FIG. 13 illustrates an image 1300 displayed on a touch screen and a selection 1310 by the user of a designated area according to an embodiment of the invention.

Figure 14:
FIG. 14 illustrates an image acquired by a smartphone and an alignment image overlaid on the acquired image according to an embodiment of the invention.

FIG. 14 illustrates an image 1430 acquired by a smartphone and an alignment image 1410 overlaid on the acquired image according to an embodiment of the invention.

Figure 15:
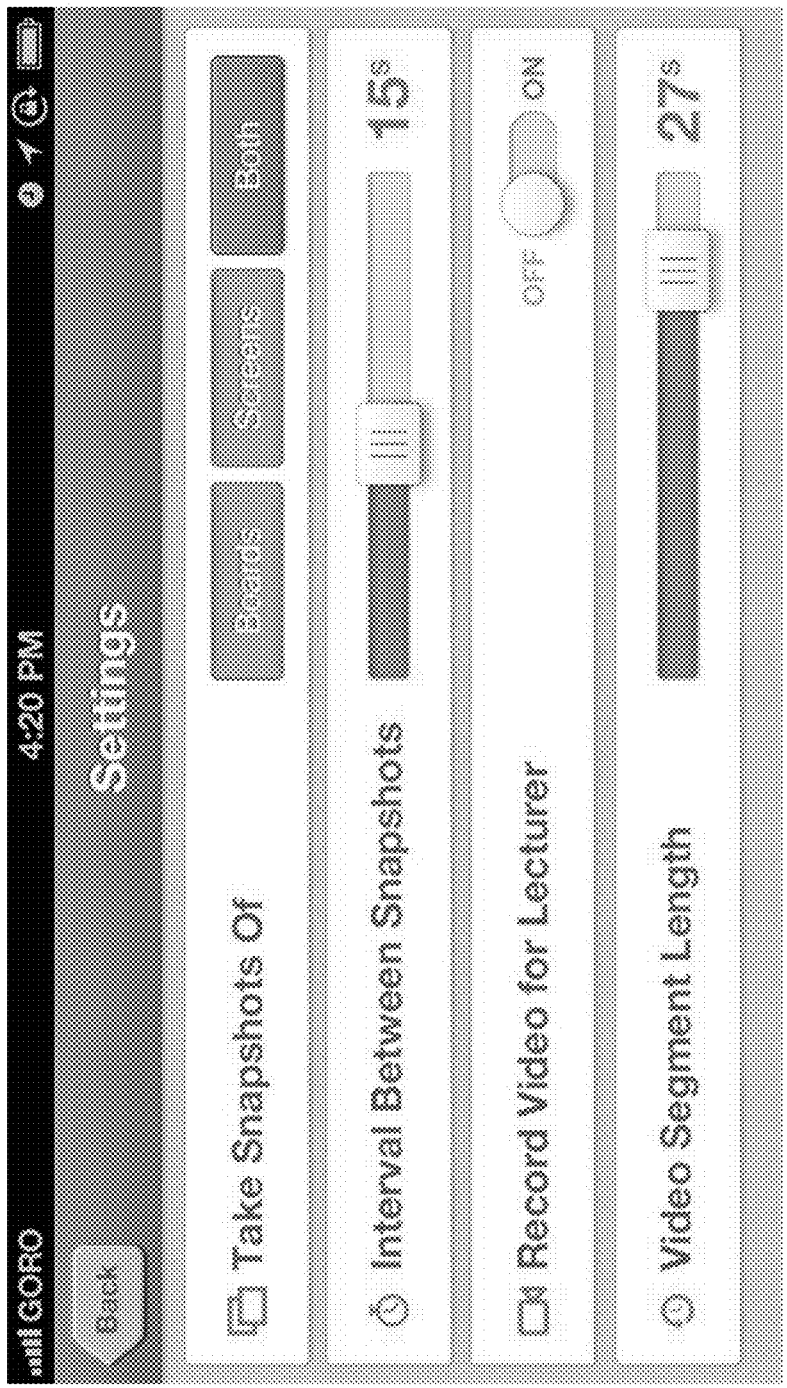
FIG. 15 illustrates a setting screen that allows a user to select audio and image acquisition parameters according to an embodiment of the invention.

FIG. 15 illustrates a setting screen 1500 that allows a user to select audio and image acquisition parameters according to an embodiment of the invention.

Figure 16:
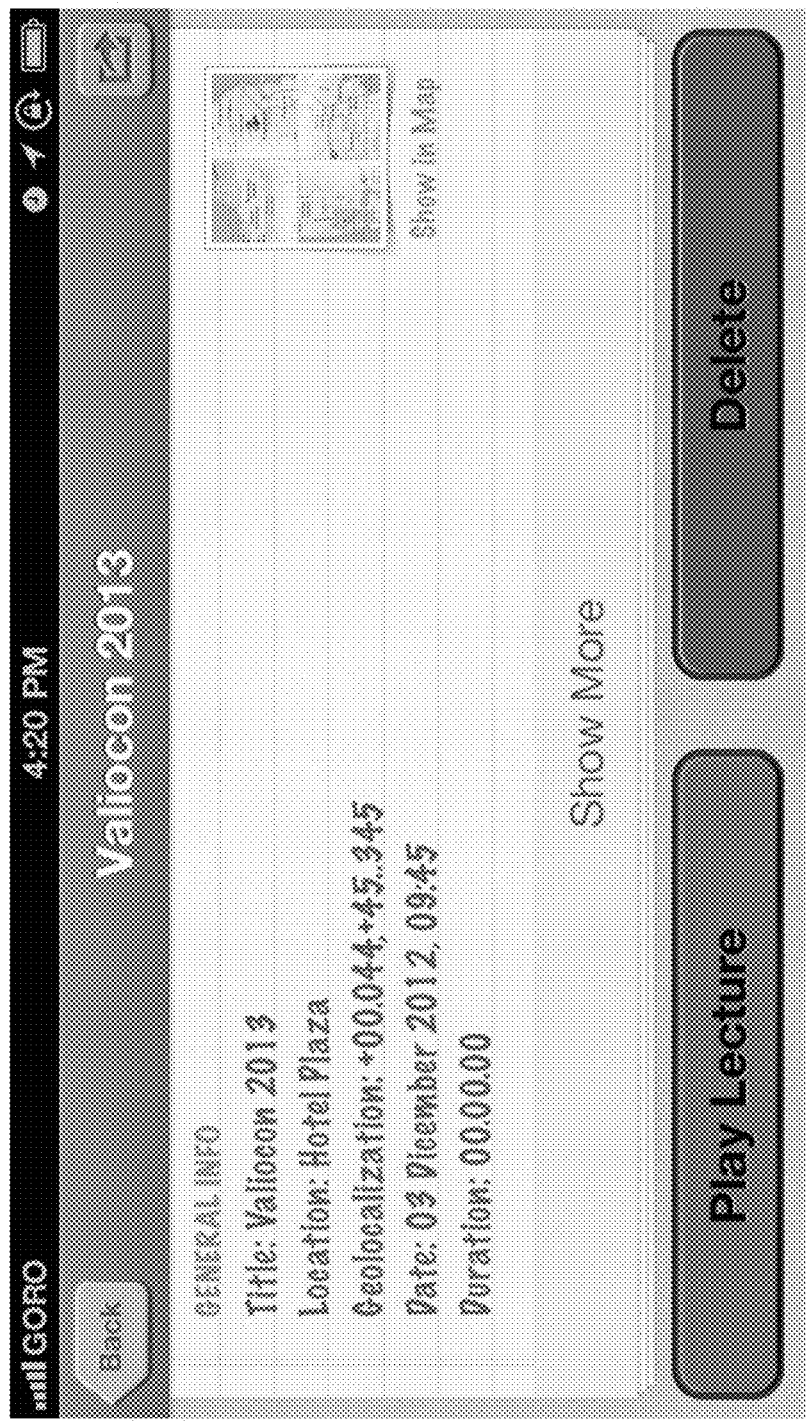
FIG. 16 illustrates metadata related to a lectures to be captured by a smartphone according to an embodiment of the invention.

FIG. 16 illustrates metadata 1600 related to a lectures to be captured by a smartphone according to an embodiment of the invention.

Figure 17:
FIG. 17 illustrates a screen that allows selection of a captured lecture to be played on a smartphone according to an embodiment of the invention.

FIG. 17 illustrates a screen1 700 that displays icons that represent various captured lectures and allows the user of a smartphone to select a captured lecture to be displayed on the smartphone according to an embodiment of the invention.

It is noted that although the previous explanations refer to a lecture that various embodiments of the invention may be applicable to other scenarios in which the manner of acquisition of visual information can be automatically selected by the detection of an event—preferably regardless of image acquisition conditions.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method for capturing visual information and audio related to a lecture, the method comprises:
   capturing, by a mobile media capture device, while being held by a user, audio information related to the lecture during a time period that at least partially overlaps a time period during which the lecture occurs;
   repeating, during the time period, the stages of:
   checking, by the mobile media capture device, while being held by the user, for an occurrence of an event related to the lecture;
   selecting, by the mobile media capture device and in response to an occurrence of the event, a selected manner to acquire, by a camera of the mobile media capture device, visual information related to the lecture out of (a) an acquisition, at a first rate, of multiple still images of at least a first resolution and (b) an acquisition of a video stream of up to a second resolution that is lower of the first resolution; wherein the first rate is lower than a rate of acquisition of images of the video stream; and
   acquiring the visual information, by the camera of the mobile media capture device, while being held by the user, according to the selected manner.

2. The method according to claim 1, wherein the selecting is indifferent to imaging conditions.

3. The method according to claim 1, wherein the event is an appearance of a face of a lecturer, within a region of interest, for a continuous period that exceeds a threshold.

4. The method according to claim 1, wherein the event related to the lecture is a detection of human movement, within a region of interest, for a continuous period that exceeds a threshold.

5. The method according to claim 1, defining, by the mobile media capture device, as a default image acquisition manner the acquisition, at the first rate, of multiple still images of at least the first resolution.

6. The method according to claim 1, comprising:
   receiving, by the mobile media capture device and from a user, a definition of a region of interest that comprises an object that is expected to convey information related to the lecture; and
   selecting, by the mobile media capture device, image acquisition characteristics to be applied during the acquisition of the visual information in response to image acquisition conditions that exists within the region of interest and regardless of image acquisition conditions that exist outside the region of interest.

7. The method according to claim 1, comprising:

inducing, by the mobile media capture device, a user to place an mobile media capture device in front of a face of the user and direct the module media capture device towards an object that is expected to bear information related to the lecture;

inducing, by the mobile media capture device, the user to define a region of interest that comprises the object that is expected to bear information related to the lecture;

acquiring, by the mobile media capture device, image of an area that comprises the object;

inducing, by the mobile media capture device, the user to lower the mobile media capture device and place the mobile media capture device on a supporting element while displaying, by the mobile media capture device, to the user a field of view of a camera of the mobile media capture device and a representation of the image of the area.

8. The method according to claim 1, comprising generating a media stream related to the lecture by merging the audio information and the visual information.

9. The method according to claim 1, comprising replacing or enhancing visual information about content that was displayed during the lecture with content information that represents the content and is provided by a third party.

10. The method according to claim 1, further comprising sending the audio information and the visual information and metadata indicative of at least timing of the acquisition of the audio information and the visual information over a network to a media editing entity.

11. The method according to claim 1 comprising replacing consecutive still images of the multiple still images that are equal to each other by a single still image.

12. The method according to claim 1 comprising performing inter-image compression.

13. A non-transitory computer readable medium that includes instructions to be executed by a by a mobile media capture device, and include instructions for: capturing, by a camera of the mobile media capture device while being held by a user, audio information related to the lecture during a time period that at least partially overlaps a time period during which the lecture occurs; repeating, during the time period, the stages of: checking, by the mobile media capture device, for an occurrence of an event related to the lecture; selecting, by the mobile media capture device and in response to an occurrence of the event, a selected manner to acquire visual information related to the lecture out of (a) an acquisition, at a first rate, of multiple still images of at least a first resolution and (b) an acquisition of a video stream of up to a second resolution that is lower of the first resolution; wherein the first rate is lower than a rate of acquisition of images of the video stream; and acquiring the visual information, while being held by the user, according to the selected manner.

14. The non-transitory readable medium according to claim 13 wherein the selecting is indifferent to imaging conditions.

15. The non-transitory readable medium according to claim 13 wherein the event is an appearance of a face of a lecturer, within a region of interest, for a continuous period that exceeds a threshold.

16. The non-transitory readable medium according to claim 13 wherein the event related to the lecture is a detection of human movement, within a region of interest, for a continuous period that exceeds a threshold.

17. The non-transitory readable medium according to claim 13 that stores instructions for defining, by the mobile media capture device, as a default image acquisition manner the acquisition, at the first rate, of multiple still images of at least the first resolution.

18. The non-transitory readable medium according to claim 13 that stores instructions for:

receiving, by the mobile media capture device and from a user, a definition of a region of interest that comprises an object that is expected to convey information related to the lecture; and selecting, by the mobile media capture device, image acquisition characteristics to be applied during the acquisition of the visual information in response to image acquisition conditions that exists within the region of interest and regardless of image acquisition conditions that exist outside the region of interest.

19. The non-transitory readable medium according to claim 13 that stores instructions for:

inducing, by the mobile media capture device, a user to place an mobile media capture device in front of a face of the user and direct the module media capture device towards an object that is expected to bear information related to the lecture;

inducing, by the mobile media capture device, the user to define a region of interest that comprises the object that is expected to bear information related to the lecture;

acquiring, by the mobile media capture device, image of an area that comprises the object;

inducing, by the mobile media capture device, the user to lower the mobile media capture device and place the mobile media capture device on a supporting element while displaying, by the mobile media capture device, to the user a field of view of a camera of the mobile media capture device and a representation of the image of the area.

20. The non-transitory readable medium according to claim 13 that stores instructions for generating a media stream related to the lecture by merging the audio information and the visual information.

21. The non-transitory readable medium according to claim 13 that stores instructions for replacing visual information about content that was displayed during the lecture with content information that represents the content and is provided by a third party.

22. The non-transitory readable medium according to claim 13 that stores instructions for sending the audio information and the visual information and metadata indicative of at least timing of the acquisition of the audio information and the visual information over a network to a media editing entity.

23. The non-transitory readable medium according to claim 13 that stores instructions for storing out of consecutive still images of the multiple still images that are equal to each other only a single still image and deleting other still images of the consecutive still images.

* * * * *